US010057460B2

(12) United States Patent
Dixit

(10) Patent No.: US 10,057,460 B2
(45) Date of Patent: Aug. 21, 2018

(54) PROVING DIGITAL PHOTOGRAPH AUTHORSHIP USING ECG BIOMETRICS

(71) Applicant: Intel Corporation, Santa Clara, CA (US)

(72) Inventor: Muralidhar M. Dixit, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 70 days.

(21) Appl. No.: 15/170,357

(22) Filed: Jun. 1, 2016

(65) Prior Publication Data

US 2017/0353624 A1      Dec. 7, 2017

(51) Int. Cl.
| H04N 5/76 | (2006.01) |
| H04N 1/44 | (2006.01) |
| H04N 1/32 | (2006.01) |
| H04N 1/21 | (2006.01) |

(52) U.S. Cl.
CPC ........... *H04N 1/442* (2013.01); *H04N 1/2112* (2013.01); *H04N 1/3232* (2013.01); *H04N 1/4486* (2013.01); *H04N 2201/0084* (2013.01); *H04N 2201/3236* (2013.01)

(58) Field of Classification Search
CPC .... H04N 1/442; H04N 1/3232; H04N 1/4486; H04N 1/2112; H04N 2201/0084; H04N 2201/3236
See application file for complete search history.

(56) References Cited

U.S. PATENT DOCUMENTS

| 2013/0022168 A1* | 1/2013 | Cho ...................... A61B 6/482 378/62 |
| 2015/0320328 A1* | 11/2015 | Albert ................. A61B 5/0402 600/480 |
| 2016/0259986 A1* | 9/2016 | Yun .................... G06K 9/00892 |
| 2017/0332967 A1* | 11/2017 | Hatori ................. A61B 5/6833 |

OTHER PUBLICATIONS

Belgacem, Noureddine, et al., "A novel biometric authentication approach using ECG and EMG signals", J Med Eng Technol, 2015; 39(4), (2015), 226-238.

* cited by examiner

*Primary Examiner* — Twyler Haskins
*Assistant Examiner* — Carramah J Quiett
(74) *Attorney, Agent, or Firm* — Schwegman Lundberg & Woessner, P.A.

(57) ABSTRACT

Techniques for proving digital photograph authorship using ECG biometrics are described. Electrodes are located on the exterior of a digital camera and are electrically coupled to an ECG circuit. When a photographer holds the camera with both hands, the electrodes detect electrical voltages from the photographer's hands and the ECG circuit produces a digital ECG signal. When the photographer uses the digital camera to capture a photograph, the camera's stenographic engine uses a stenographic key to embedded the ECG signal into the raw image file, producing a watermarked image. The camera's cryptographic engine uses a cryptographic key to encrypt the watermarked image to produce an encrypted image. If a dispute arises regarding authorship of the photograph, the stenographic and cryptographic engines convert the encrypted image into the raw image file and the photographer's ECG signals, which are compared to the ECG signals of the disputed author(s).

23 Claims, 10 Drawing Sheets

US 10,057,460 B2

PROVING DIGITAL PHOTOGRAPH AUTHORSHIP USING ECG BIOMETRICS

TECHNICAL FIELD

The present disclosure relates generally to digital photography, and specifically to proving digital photograph authorship using ECG biometrics.

BACKGROUND

Copyright law gives ownership of a photograph to the person who authored/created the photograph. However, there are currently no methods to conclusively prove who authored (e.g., "photographed," "shot," or "took") a digital photograph. Using raw image files and exchangeable image file format ("EXIF"), a digital photograph may be proven to have been created with a particular digital camera, but the photographer of the digital photograph cannot be proven.

Currently, a person who has physical possession of (1) the digital camera used to create a digital photograph and (2) the raw image file corresponding to the digital photograph generally has the best claim to ownership and copyright of the digital photograph, regardless of who actually authored the digital photograph. Other techniques to prove authorship of a disputed digital photograph include providing circumstantial evidence, such as a sequence of digital photographs that were authored at approximately the same time as and include elements of the disputed digital photograph, testimony from persons identified in the disputed digital photograph, etc. However, these techniques are often labor and/or time intensive and often do not conclusively establish authorship of the disputed digital photograph.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments or examples discussed in the present document.

DETAILED DESCRIPTION

The present disclosure describes methods, systems, and computer program products that individually facilitate proving digital photograph authorship using ECG biometrics. In the following detailed description, for purposes of explanation, numerous specific details are set forth in order to provide a thorough understanding of the various aspects of the presently disclosed subject matter. However, it will be evident to those skilled in the art, after reading and understanding the present subject matter, that the presently disclosed subject matter may be practiced without these specific details. In other instances, well-known methods, procedures, and components have not been described in detail so as not to obscure the presently disclosed subject matter.

Electrocardiography ("ECG" or "EKG") is the process of recording the electrical activity of the heart over a period of time. The overall magnitude and direction of the heart's electrical depolarization is captured at each moment throughout the cardiac cycle. The graph of voltage versus time produced by electrocardiography is referred to as an electrocardiogram (also abbreviated "ECG" or "EKG").

ECG signals have been found to be unique to the individual whose heart generated the ECG signal. Even identical twins will have differing ECG signals. Thus, ECG signals may be used for biometric authentication.

Disclosed embodiments measure ECG signals from a person holding a digital camera during capture of a photograph and securely conceal, using digital stenography techniques, the measured ECG signals into the raw image file captured by the digital camera. If an authorship dispute regarding the photograph arises, the ECG signals may be extracted from the raw image file and compared with the ECG signals of the person(s) claiming to have authored the photograph.

Figure 1:
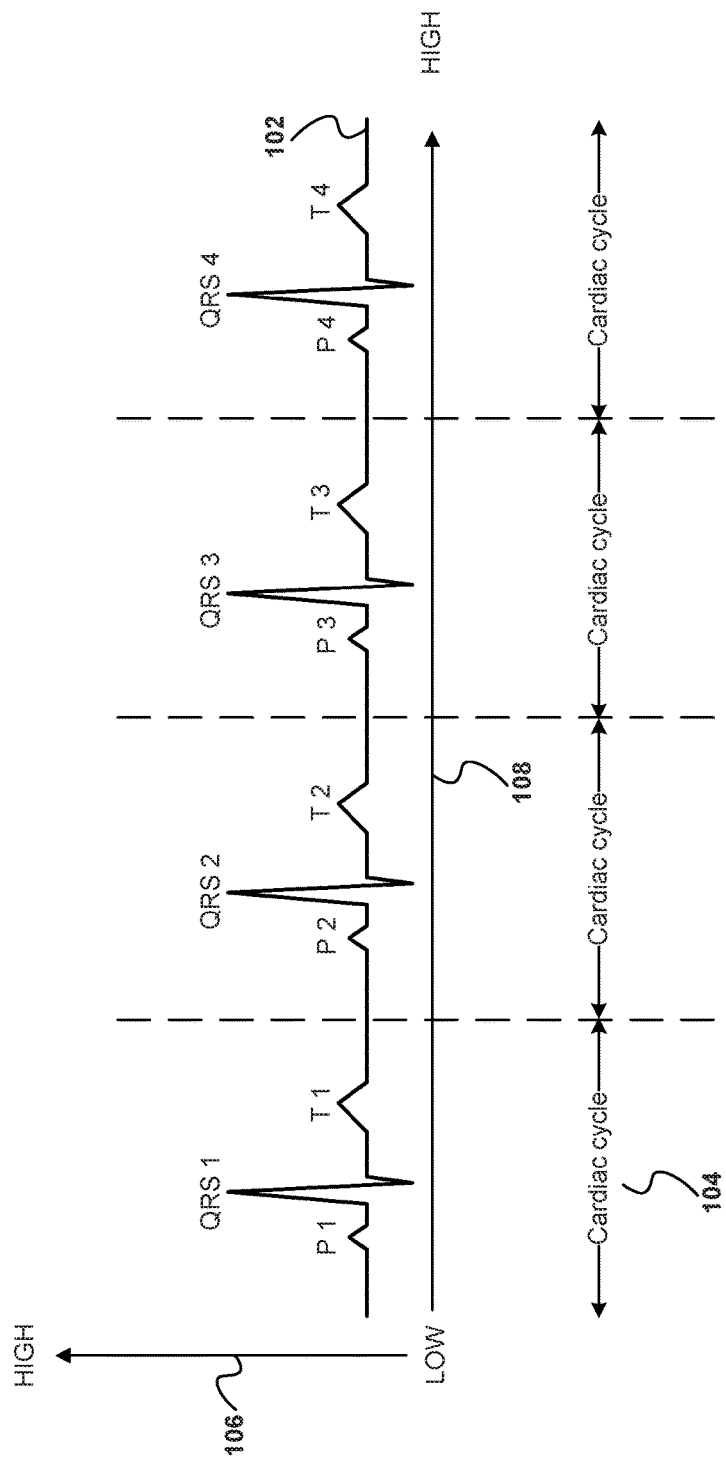
FIG. 1 illustrates a typical ECG signal of a human heart, according to an example embodiment.

FIG. 1 illustrates a typical ECG signal 102 of a human heart, according to an example embodiment. An ECG signal 102 comprises one or more cardiac cycles 104. A cardiac cycle 104 refers to a complete heartbeat from its generation to the beginning of the next heartbeat. A "normal" heartbeat produces four electrical entities: a P wave, a QRS complex, a T wave, and a U wave; each of these entities has a distinctive pattern. The U wave is not typically seen and its absence is generally ignored.

In a normal heart at rest, the physiologic rhythm of the heart is normal sinus rhythm ("NSR"), which produces the prototypical pattern of P wave, followed by a QRS complex, followed by a T wave. The ECG signal 102 is usually illustrated on a Cartesian graph as a function of electrical voltage (e.g., amplitude) over time, with the Y-axis 106 representing electrical voltage and the X-axis 108 representing time.

An electrocardiograph is a machine that is used to perform electrocardiography, and produces the electrocardiogram. An "electrode" is a conductive material which, when in contact with a human body, makes an electrical circuit with the electrocardiograph. A typical "12-lead" ECG is performed with 10 electrodes placed on specific areas of the patient's body and connected to the electrocardiograph.

However, ECG signals 102 may also be measured with two electrodes—one electrode from each side (e.g., left/right) of the heart. This is known as a "Lead I" ECG. Thus, a user's ECG signal 102 may be measured using two electrodes that are in contact with the user's left and right hands, such as when the user holds a digital camera with both hands.

Figure 2:
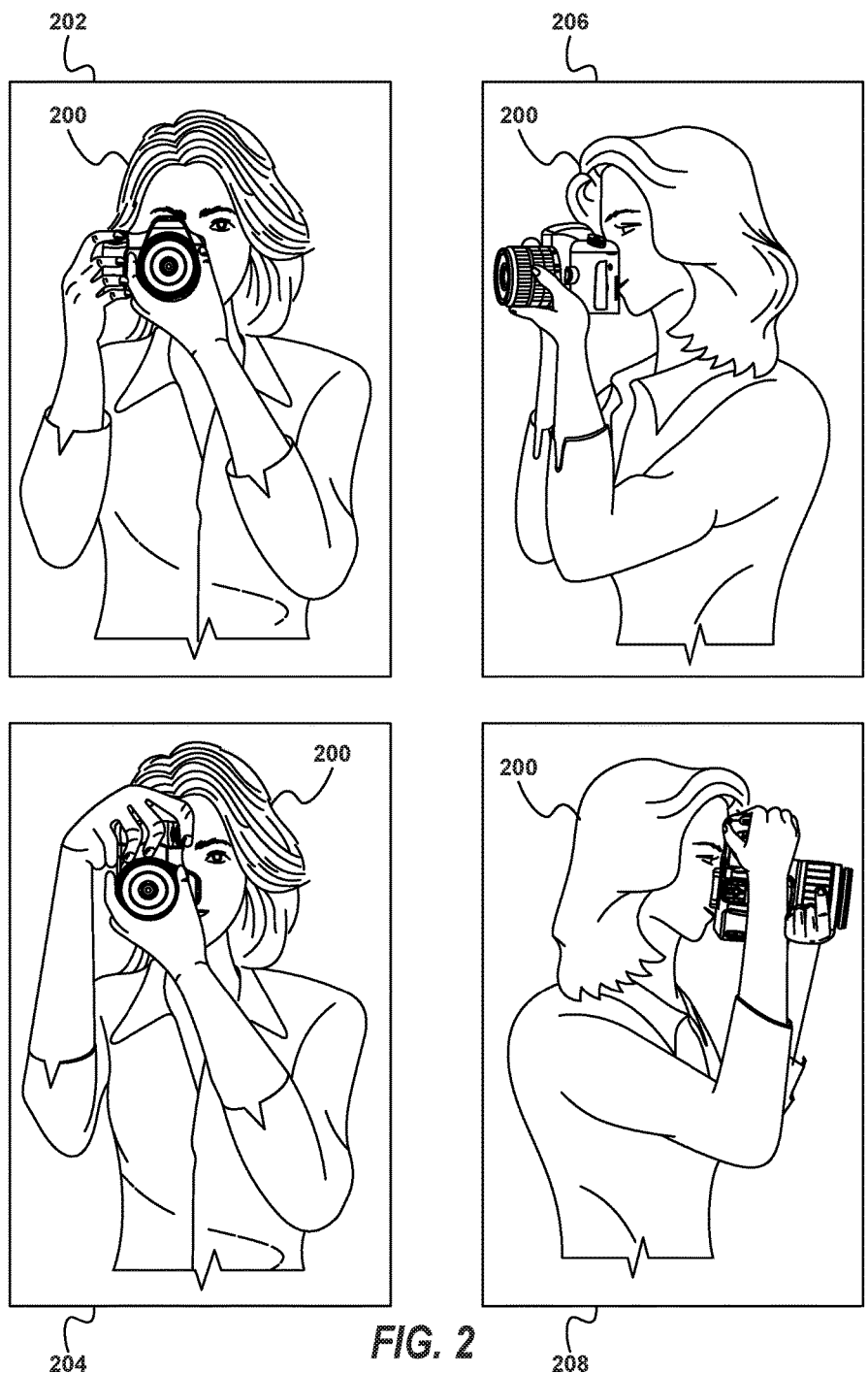
FIG. 2 illustrates front views and side views of a photographer taking a picture with a digital camera, according to an example embodiment.

FIG. 2 illustrates front views 202, 204 and side views 206, 208 of a photographer 200 taking a picture with a digital camera, according to an example embodiment. It is common for a photographer 200 to take pictures with a digital camera while holding the digital camera with both hands, especially if the digital camera (1) is a digital single-lens reflex ("DSLR") camera, (2) uses a zoom lens, or (3) was expensive. One hand is often used to steady the camera body or the camera lens, while the other hand is often used to grasp the camera body and to push the shutter-release control (e.g., a mechanical, electronic, or virtual button which, when pressed, causes the digital camera to open the digital camera's shutter to capture a picture).

Front view 202 illustrates the photographer 200 holding the digital camera in a horizontal position, whereas front view 204 illustrates the photographer 200 holding the digital camera in a vertical position. Side view 206 illustrates the photographer 200 holding the digital camera in a horizontal position, whereas side view 208 illustrates the photographer 200 holding the digital camera in a vertical position.

Figure 3:
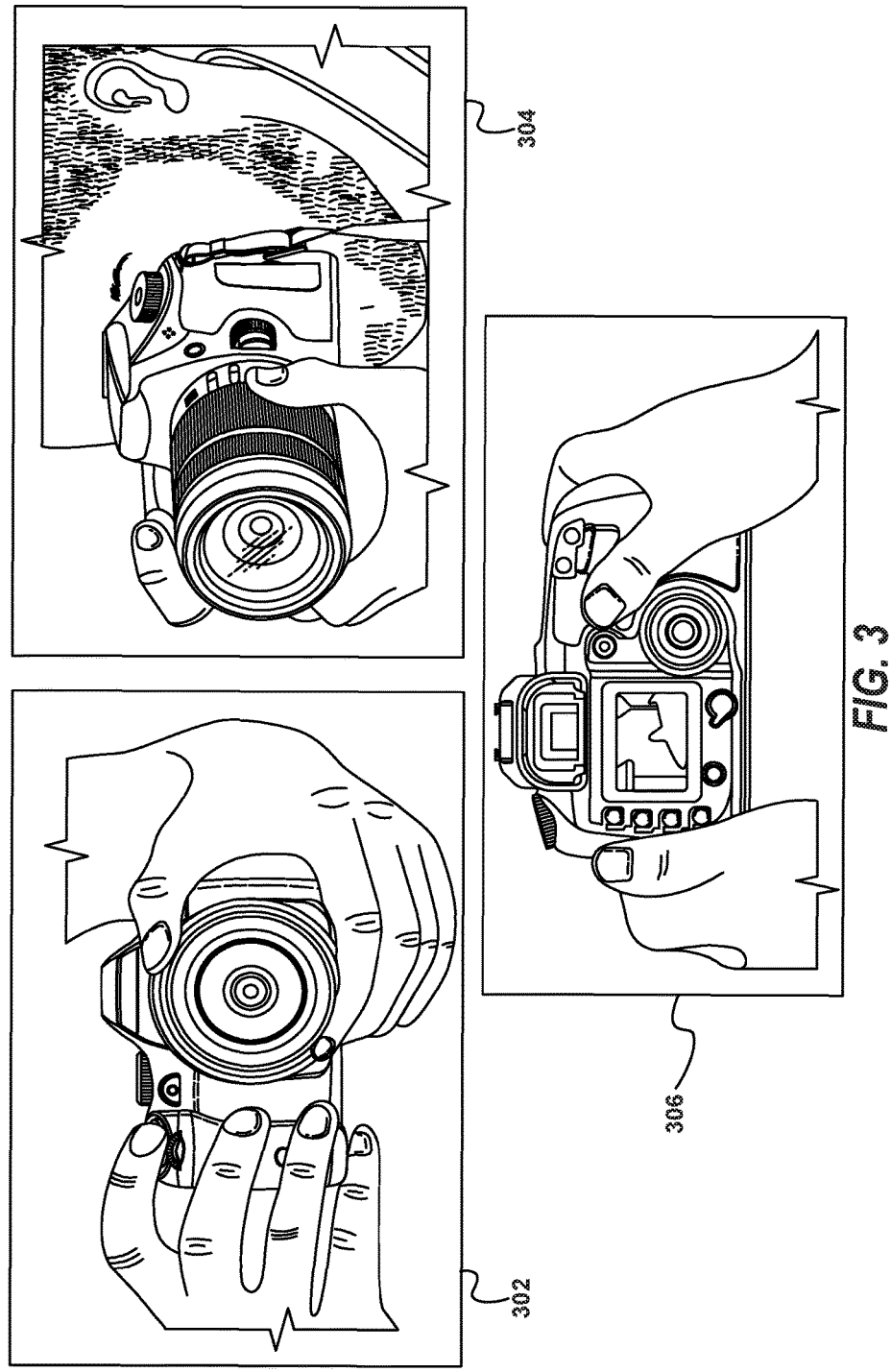
FIG. 3 illustrates several views of different hand positions a photographer may use when taking a picture with a digital camera, according to an example embodiment.

FIG. 3 illustrates several views 302, 304, 306 of different hand positions a photographer may use when taking a picture with a digital camera, according to an example embodiment. Views 302 and 304 show the photographer's right hand gripping the camera body while the photographer's left hand is adjusting the zoom lens, while view 306 shows the photographer gripping the camera body with both hands. Other hand positions that are not illustrated are also possible; for example, the photographer may use one hand to hold the bottom of the camera body, etc.

Figure 4:
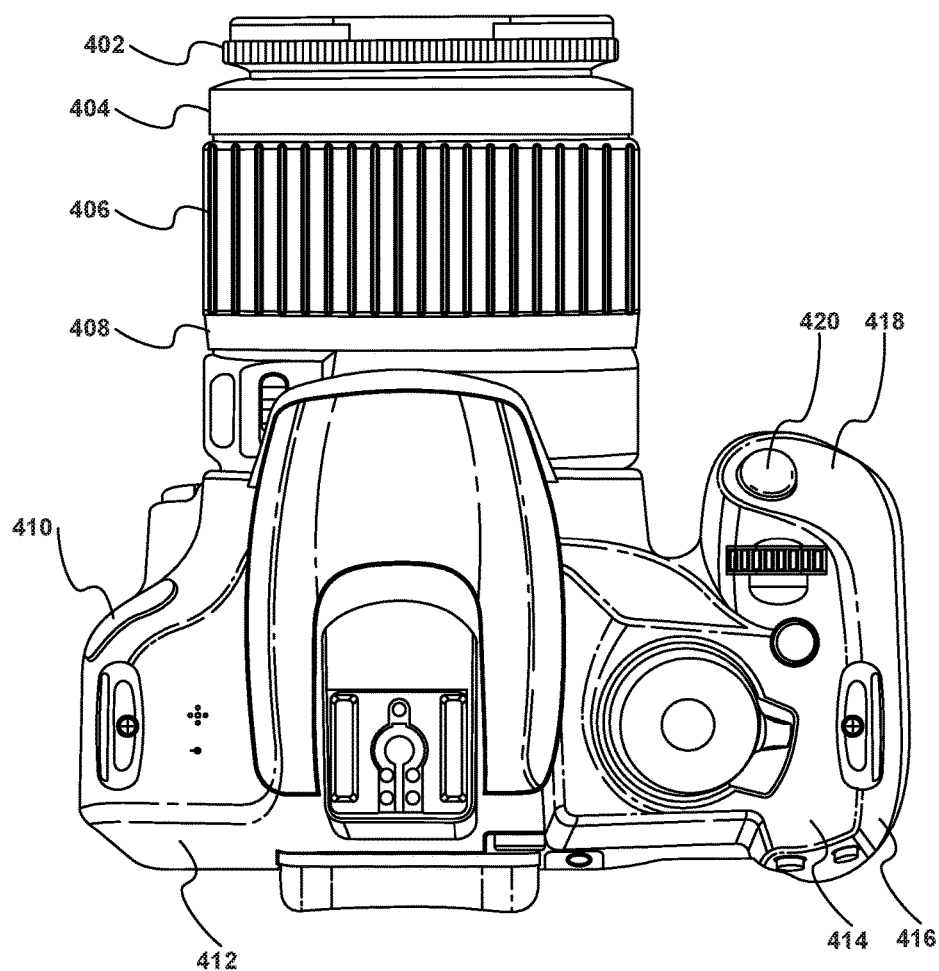
FIG. 4 illustrates areas of a digital camera that include ECG electrodes for measuring a photographer's ECG signals, according to an example embodiment.

FIG. 4 illustrates areas of a digital camera 400 that include ECG electrodes for measuring a photographer's ECG signal(s), according to an example embodiment. The digital camera 400 illustrated in FIG. 4 is a right-handed digital camera; a left-handed digital camera would have similar contact areas, but would be mirrored when compared to the contact areas of a right-handed digital camera 400.

The digital camera 400 may include multiple contact areas 402-420, which are exterior areas of the digital camera 400 that typically are in contact with a photographer's hands when the photographer is taking photographs with the digital camera 400. At least two contact areas of the digital camera 400 include ECG electrodes for measuring the photographer's 200 ECG signal(s) 102. For example, an ECG electrode may be included in one or more of a left portion of the camera body, the right portion of the camera body, the bottom of the camera body, the housing of the camera lens, the shutter-release button, etc. The electrodes may be adhered to the exterior of the camera, may be fixed within the camera/lens body, or a combination thereof.

In an embodiment, the electrodes produce a low-voltage electrical charge that travels up one arm of the photographer, through the photographer's body to the other arm, and then down the arm to another electrode. The electrodes are connected to one or more ECG circuits; an ECG circuit is an analog-to-digital converter that converts the analog ECG measurements from the electrodes into a digital ECG signal.

In an embodiment, an ECG signal sufficient for identification purposes requires approximately three to five seconds of ECG data to be sampled. However, a typical digital camera 400 captures a photograph in less than 0.25 seconds. Various methods may be used to deal with this time difference. For example, the digital camera 400 may require the photographer to hold the digital camera 400 with both hands and wait until the digital camera 400 has sampled a sufficient amount of ECG data before the photographer may begin photographing, then as the photographer is photographing, use a rolling window of ECG data for each captured photograph (e.g., use the ECG data corresponding to the three to five seconds prior to the captured photograph). This may be convenient for photographers, especially professional photographers, because photographers rarely take only one photograph while holding a digital camera 400.

Another method to deal with the time difference may be to allow varying levels of statistical accuracy for the ECG data, such that a photographer may opt to use a less statistically accurate ECG data sample for a photograph in exchange for less time having to hold the digital camera 400 with both hands before the photographer may begin photographing.

Yet another method may be to associate a photographer's ECG signals to a photography "session." For example, a session may begin by the sampling of the photographer's ECG signals; the session may end automatically after a period of time, or the photographer may end the session manually, such as by pressing a button on the camera. During the photography session, any photographs captured by the camera are attributed to the photographer. Other methods may also be used.

The digital camera 400 may have a visual or audio indicator to indicate either when the photographer may begin photographing or the statistical accuracy of the sampled ECG data. If a visual indicator is used, the visual indicator may be visible on the body of the digital camera 400 or may be displayed in a viewfinder of the digital camera 400.

In an embodiment, when the photographer presses the shutter-release control, the digital camera 400 begins measuring the ECG signal of the photographer. In such an embodiment, the digital camera 400 may require the photographer to continue to hold the digital camera 400 until digital camera 400 has sampled a sufficient amount of ECG data. The digital camera 400 may use a visual or audio indicator indicate to the photographer either when the digital camera 400 has sampled a sufficient amount of ECG data or the statistical accuracy of the sampled ECG data.

Although FIG. 4 illustrates a DSLR camera 400, the techniques disclosed in this application may also be used with other types of cameras (e.g., video cameras, smartphone cameras, etc.).

Figure 5:
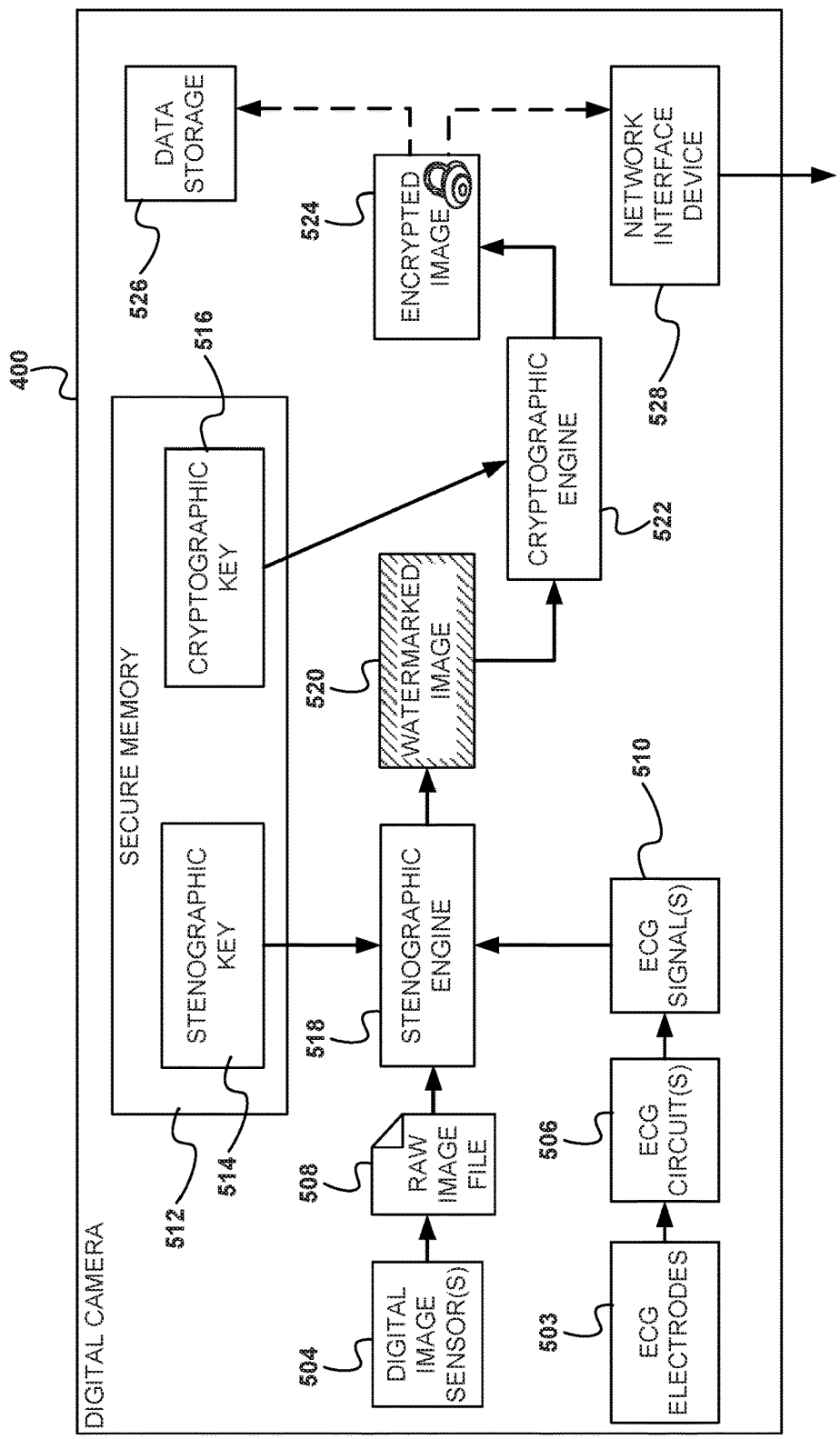
FIG. 5 illustrates operations within a digital camera to convert a raw image file and an ECG signal captured by the digital camera into an encrypted image whose authorship may be proved using ECG biometrics, according to an example embodiment.

FIG. 5 illustrates operations within a digital camera 400 to convert a raw image file 508 and an ECG signal 510 captured by the digital camera 400 (FIG. 4) into an encrypted image 524 whose authorship may be proved using ECG biometrics, according to an example embodiment. Two or more ECG electrodes 503 are used to measure voltages from the hands of the photographer holding the digital camera 400. One or more ECG circuits 506 are used to convert the measured voltages into one or more digital ECG signals 510.

Two common photographic file formats are "raw" and JPEG. A raw image file 508 is like a photographic "negative," whereas a JPEG file is like a photographic "positive" or "print." A raw image file 508 is uncompressed, whereas a JPEG file is usually compressed. One or more digital image sensors 504 are used to capture light from the aperture of digital camera 400 and convert the light into a raw image file 508.

Secure memory 512 stores a stenographic key 514 and a cryptographic key 516. The secure memory 512 may be read-only memory and may be non-volatile. Although illustrated as one memory, the secure memory 512 may comprise multiple secure memories 512. Each of the stenographic key 514 and the cryptographic key 516 are unique to the digital camera 400. Each of the stenographic key 514 and the cryptographic key 516 may be encrypted such that only the stenographic engine 518 and cryptographic engine 522 of the digital camera 400 may access and read the stenographic key 514 and the cryptographic key 516, respectively. The stenographic engine 518 and the cryptographic engine 522 may be implemented in hardware.

The stenographic engine 518 accepts as inputs a raw image file 508, one or more ECG signals 510, and the stenographic key 514. The stenographic engine 518 uses one or more key-based stenographic algorithms and the stenographic key 514 to embed the ECG signals 510 into the raw image file 508, producing a watermarked image 520. Any stenographic algorithm may be used as long as the algorithm is "lossless" (e.g., the quality of the watermarked image 520 is not less than the quality of the raw image file 508).

The cryptographic engine 522 accepts as inputs the watermarked image 520 (which was produced by the stenographic engine 518) and the cryptographic key 516. The cryptographic engine 522 may use one or more key-based encryption algorithms and the cryptographic key 516 to encrypt the watermarked image 520, producing an encrypted image 524. The one or more key-based encryption algorithms and the cryptographic key 516 should be cryptographically secure (e.g., the Advanced Encryption Standard (AES) with 128-bit or 256-bit key sizes). The one or more key-based encryption algorithms may be symmetric ("private-key") or asymmetric ("public-key") encryption algorithms.

The watermarked image 520 is not available outside of the digital camera 400; only the stenographic engine 518 and the cryptographic engine 522 may use the watermarked image 520. After the watermarked image 520 has been encrypted, the digital camera 400 securely deletes the watermarked image 520. In contrast, the raw image file 508 and the encrypted image 524 are available to the photographer. The photographer may freely use the raw image file 508 just as any other raw image file 508 produced by current digital cameras 400. For example, the photographer may print the raw image file 508, post-process the raw image file 508, make copies of the raw image file 508, share the raw image file 508, etc. The photographer may store the encrypted image 524 to prove the photographer's authorship in future authorship disputes regarding the corresponding photograph (e.g., raw image file 508).

The encrypted image 524 may be stored in data storage 526, which may be removable storage (e.g., a memory card). The encrypted image 524 may optionally be provided to a network interface device 528 for transmission to an external device. The network interface device 528 may be a serial (e.g., universal serial bus (USB)), parallel, or other wired or wireless (e.g., infrared (IR), near field communication (NFC), etc.) controller for communicating with external devices.

In an embodiment, rather than being fixed within the digital camera 400, one or more of the following elements may be located on a removable cartridge that may be inserted into and removed from the digital camera 400: digital image sensor(s) 504, ECG circuit(s) 506, secure memory 512, stenographic key 514, cryptographic key 516, stenographic engine 518, cryptographic engine 522, data storage 526, and network interface device 528. In such an embodiment, the stenographic key 514 and cryptographic key 516 are unique to the removable cartridge rather than the digital camera 400. When a photographer replaces a digital camera 400 with a new digital camera 400, the removable cartridge may be removed from the old digital camera 400 and inserted into the new digital camera 400; thus, the photographer would not need to rely on the old digital camera 400 for proving the photographer's authorship of a digital photograph, and thus, the photographer would not need to keep the old digital camera 400. In an embodiment, the removable cartridge may be a hardware dongle (e.g., a USB device) that may be connected to a computer.

Figure 6:
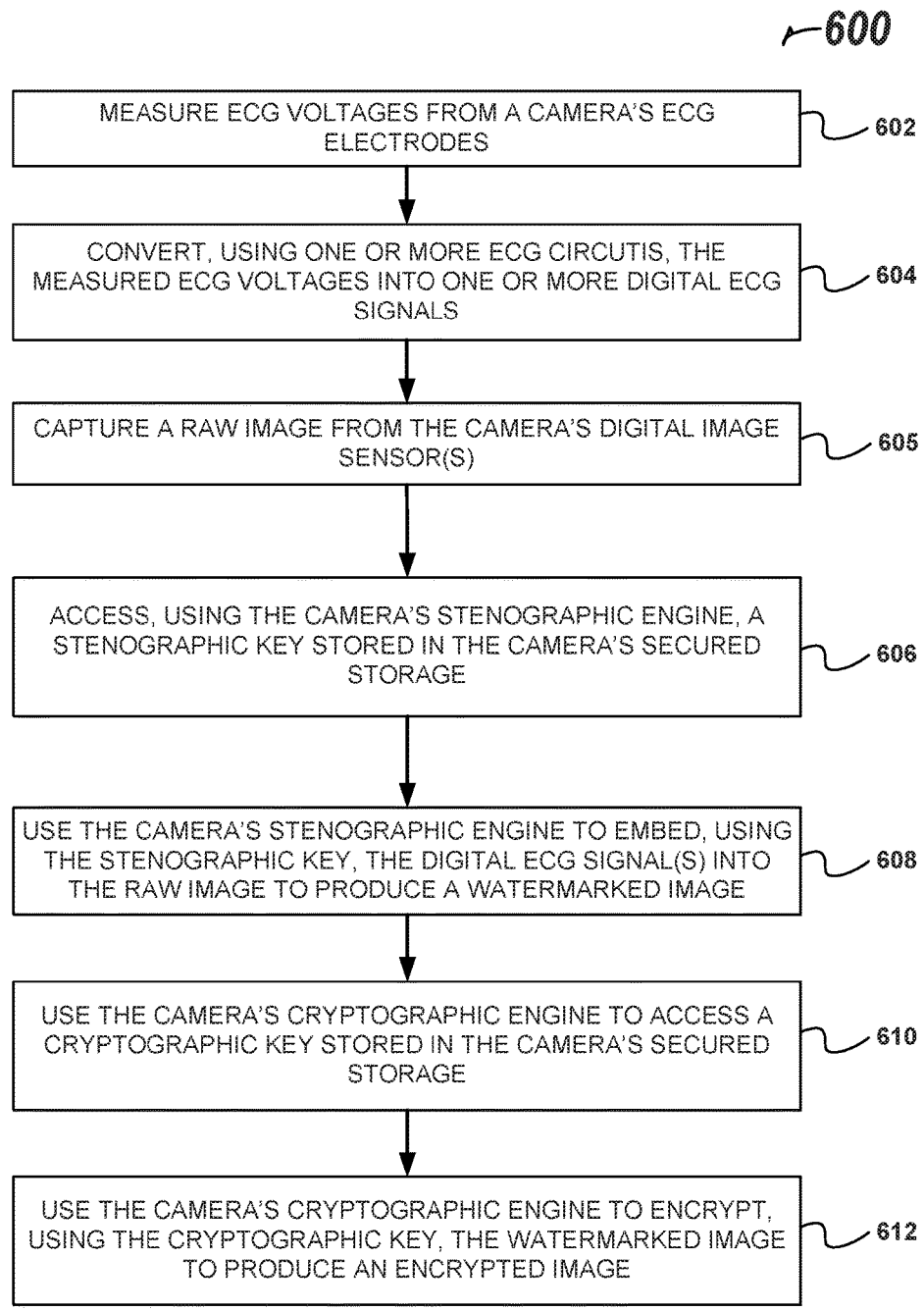
FIG. 6 is a flowchart illustrating operations of using a digital camera to produce an encrypted image whose authorship may be proved using ECG biometrics, according to an example embodiment.

FIG. 6 is a flowchart 600 illustrating operations of using a digital camera to produce an image whose authorship may be proved using ECG biometrics, according to an example embodiment.

ECG voltages are measured from the ECG electrodes of the digital camera (operation 602).

The measured ECG voltages are converted by the one or more ECG circuits into one or more digital ECG signals (operation 604).

A raw image file is captured from one or more digital image sensors of the digital camera (operation 605).

The stenographic key stored in the secure memory of the digital camera is accessed by the stenographic engine of the digital camera (operation 606).

The stenographic engine of the digital camera embeds, using the stenographic key, the one or more digital ECG signals into the raw image file to produce a watermarked image (operation 608).

The cryptographic key stored in the secure memory of the digital camera is accessed by the cryptographic engine of the digital camera (operation 610).

The cryptographic engine of the digital camera encrypts, using the cryptographic key, the watermarked image to produce an encrypted image (operation 612).

Figure 7:
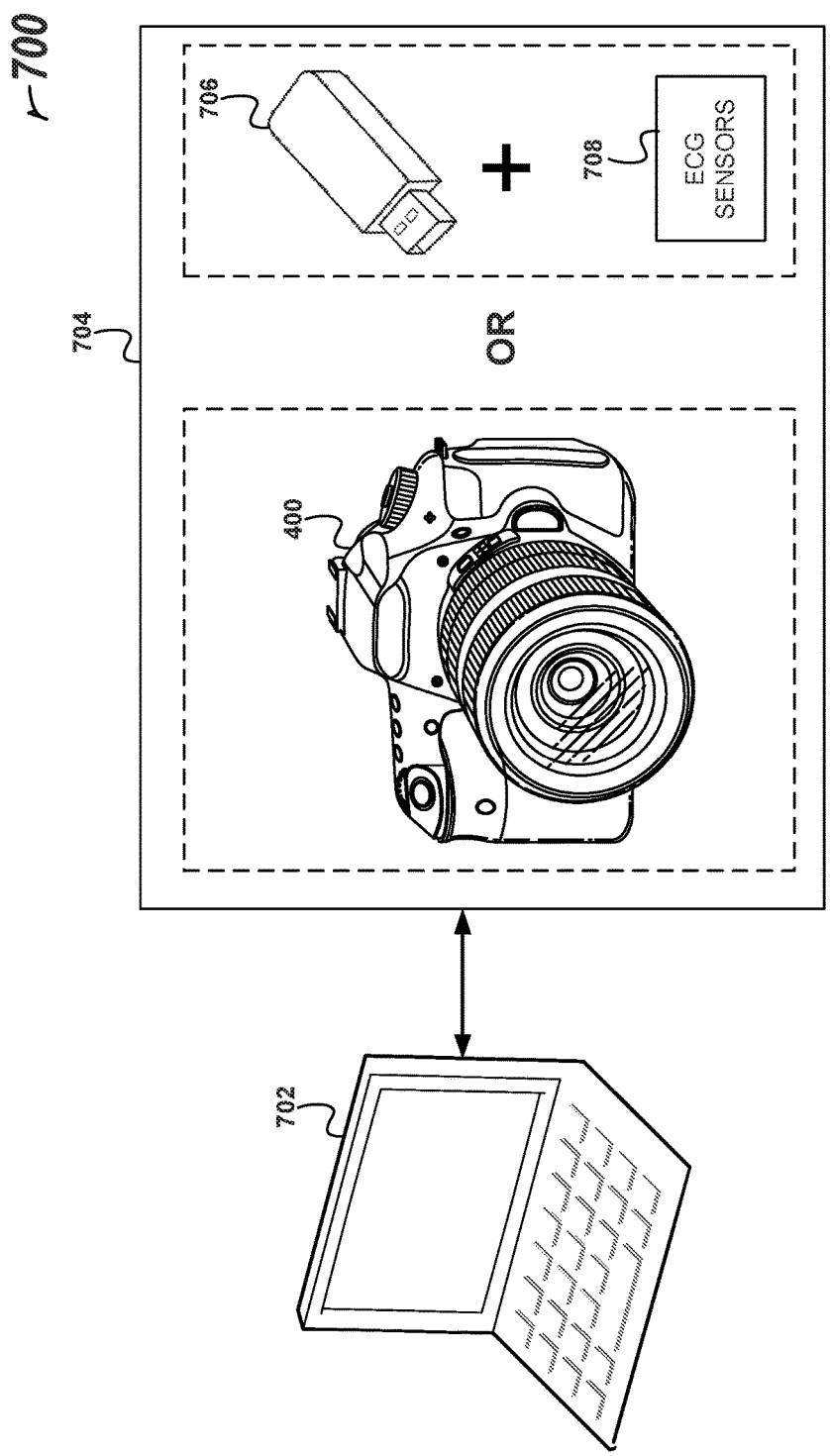
FIG. 7 illustrates hardware used to prove authorship of a digital photograph using ECG biometrics, according to an example embodiment.

FIG. 7 illustrates hardware used to prove authorship of a digital photograph using ECG biometrics, according to an example embodiment. A computer 702 may be used to execute software that facilitates the process of proving authorship of a digital photograph using ECG biometrics. The computer 702 may also be used to transfer data (e.g., files, information, etc.) to and from other hardware 704 that may be used to prove authorship of a digital photograph using ECG biometrics.

To prove authorship of a digital photograph using ECG biometrics requires (1) the stenographic key and the cryptographic key of the digital camera used to author the photograph and (2) ECG circuit(s). Thus, the digital camera, which includes the stenographic key, the cryptographic key, and ECG circuit(s), may be used.

As with most modern technology, digital cameras become outdated rather quickly. New digital camera models with new features are released annually or even more frequently. In contrast, a copyright may endure for many decades; current U.S. Copyright law extends copyright to the life of the author plus an additional 70 years. Thus, a copyright/authorship dispute regarding a photograph may occur long after the author has replaced the digital camera used to author the photograph.

In situations where the digital camera used to author the photograph is unavailable or is inconvenient to access, authorship may be proved by using (1) a hardware dongle 706 (e.g., a USB device) that includes a stenographic key and a cryptographic key corresponding to the stenographic key and the cryptographic key of the digital camera of the digital camera and (2) one or more ECG circuits 708 (other than the one or more ECG circuits that are part of the digital camera). The hardware dongle 706 may be provided by the manufacturer of the digital camera. For example, the hardware dongle 706 may be included in the purchase of the digital camera, or the manufacturer of the digital camera may offer the hardware dongle 706 as an additional purchase. The one or more ECG circuits 708 may be standard, not manufacturer-specific ECG circuits that may connect to either the computer 702 or the hardware dongle 706. In an embodiment, the hardware dongle 706 is the removable cartridge mentioned with regard to FIG. 5.

When authorship of a photograph is in dispute, either the digital camera or the corresponding hardware dongle 706 may be connected to the computer 702. The encrypted image (which was generated by the digital camera when the photograph was authored) may be transferred from the computer 702 to either the digital camera or the corresponding hardware dongle 706. The digital camera or the corresponding hardware dongle 706 accepts as input the encrypted image and returns to the computer 702 the raw image file and the ECG signal(s) that were embedded within the encrypted image. Using either the digital camera or the ECG circuit(s) 708, the ECG signal(s) of one or more disputed authors are measured and transferred to the computer 702.

Finally, the computer 702 executes software that, using techniques that are well known in the art, statistically compares (1) the disputed photograph to the raw image file and (2) the measured ECG signal(s) of the one or more disputed authors and the ECG signal(s) extracted from the encrypted image. These comparisons will give a statistical answer as to (1) whether the disputed photograph is the same or is a derivative work of the raw image file, and (2) whether the measured ECG signals of a disputed author match the ECG signal(s) extracted from the original encrypted image, which was created by the true author.

Figure 8:
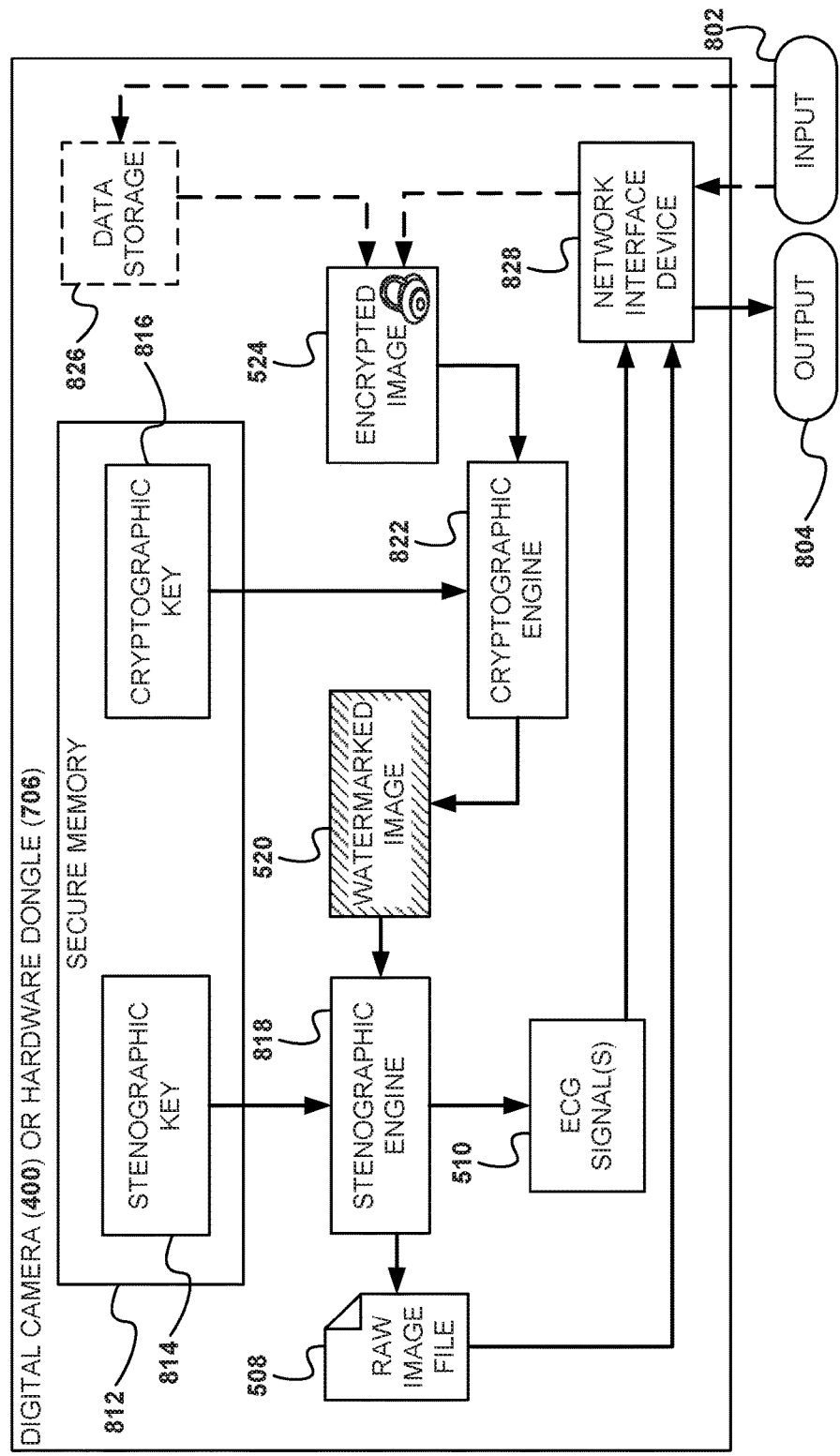
FIG. 8 illustrates operations within a hardware unit to extract a raw image file and ECG signal(s) from an encrypted image whose authorship may be proved using ECG biometrics, according to an example embodiment.

FIG. 8 illustrates operations within a hardware unit 800 to extract a raw image file and ECG signal(s) from the encrypted image whose authorship may be proved using ECG biometrics, according to an example embodiment. The hardware unit 800 may be either the digital camera or its corresponding hardware dongle. In an embodiment, if the hardware unit 800 is a hardware dongle corresponding to the digital camera, the hardware unit 800 includes the following elements, which may cryptographically correspond to or be identical to the corresponding elements of the digital camera: secure memory 812, stenographic key 814, cryptographic key 816, stenographic engine 818, cryptographic engine 822, optional data storage 826, and network interface device 828. In this document, cryptographic correspondence means that the cryptographic key 816 and cryptographic engine 822 of the hardware unit 800 may be used to decrypt an image encrypted with the cryptographic key of the digital camera; likewise, the stenographic key 814 and stenographic engine 818 of the hardware unit 800 may be used to extract the raw image file watermarked by the stenographic key of the digital camera 400.

The encrypted image is provided as input 802 to hardware unit 800 via either data storage 826 or network interface device 828. The cryptographic engine 822 accepts as input the encrypted image and the cryptographic key 816. The cryptographic engine 822 may use one or more key-based decryption algorithms and the cryptographic key 816 to decrypt the encrypted image 524, producing the watermarked image.

The stenographic engine 818 accepts as inputs the watermarked image and the stenographic key 814. The stenographic engine 818 uses one or more key-based stenographic algorithms and the stenographic key 814 to extract from the watermarked image the ECG signal(s) and the raw image file. The network interface device 828 outputs 804 the ECG signal(s) and the raw image file to the computer 702.

Figure 9:
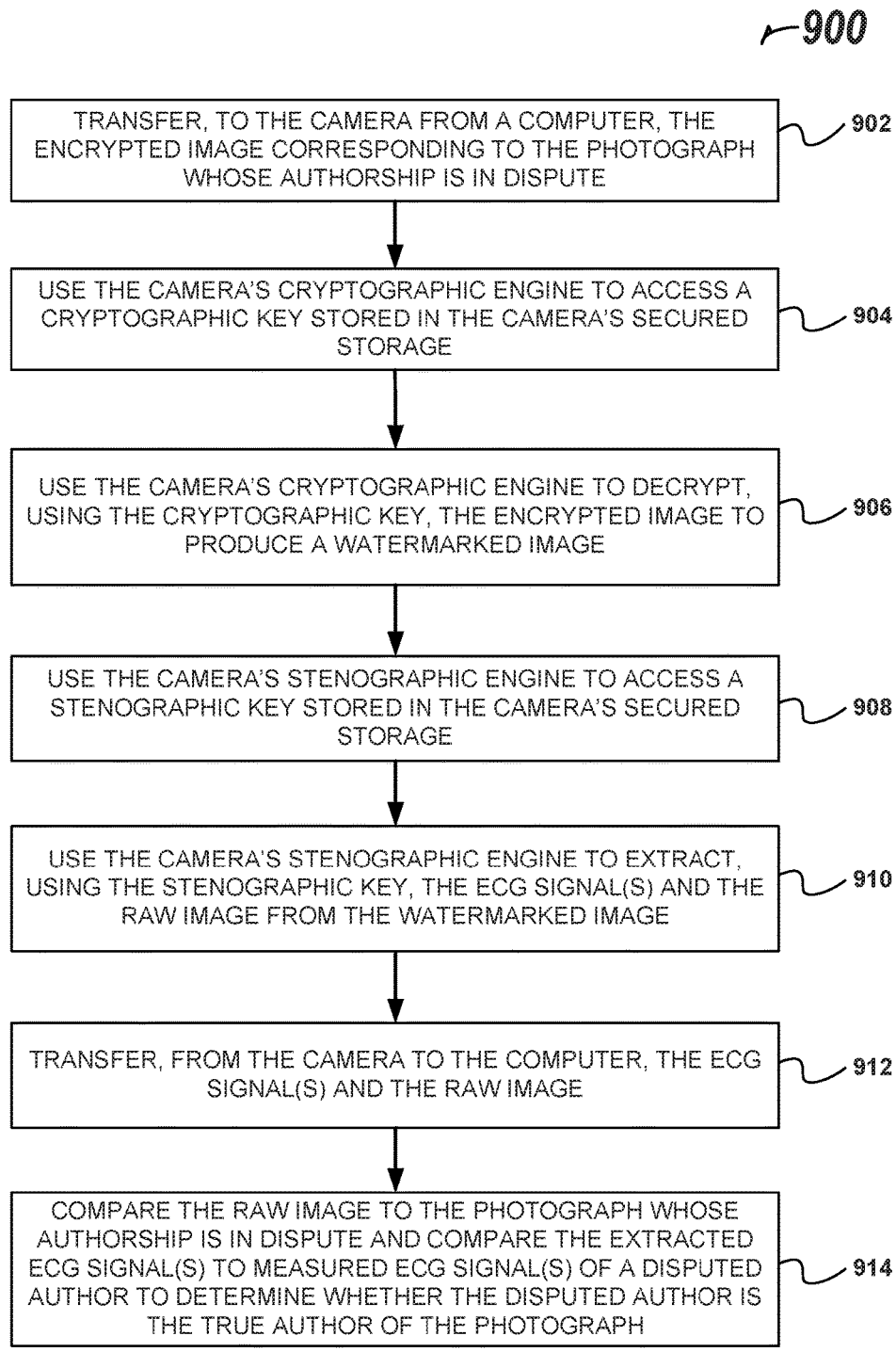
FIG. 9 is a flowchart illustrating operations of using a digital camera to prove authorship of a photograph using ECG biometrics, according to an example embodiment.

FIG. 9 is a flowchart 900 illustrating operations of using a digital camera to prove authorship of a photograph using ECG biometrics, according to an example embodiment.

The encrypted image, corresponding to the photograph whose authorship is in dispute, is transferred from the computer 702 to the digital camera (operation 902).

The cryptographic key stored in the secure memory of the digital camera is accessed by the cryptographic engine of the digital camera (operation 904).

The encrypted image is decrypted, by the cryptographic engine using the cryptographic key, to produce the watermarked image (operation 906).

The stenographic key stored in the secure memory of the digital camera is accessed by the stenographic engine of the digital camera (operation 908).

The stenographic engine of the digital camera, using the stenographic key, extracts from the watermarked image the one or more ECG signals and the raw image file (operation 910).

The extracted one or more ECG signals and the raw image file 508 are transferred from the digital camera to the computer (operation 912).

Using statistical software executing on the computer, a determination is made as to whether a disputed author is the true author of the photograph by (1) comparing the raw image file to the photograph whose authorship is in dispute and (2) comparing the extracted ECG signal(s) to measured ECG signal(s) of the disputed author (operation 914).

Although this disclosure has described techniques for proving authorship of digital photographs, the disclosed techniques may also be applied to digital videos, which are a series of digital photographs captured in rapid succession (e.g., 24 frames/photographs per second). However, applying the disclosed stenographic and cryptographic techniques to each frame of a video may be computationally prohibitive. Instead, the digital camera may apply the disclosed techniques to a subset of frames of the digital video. For example, the digital camera may apply the disclosed techniques to the first frame, the last frame, every $N^{th}$ frame, etc. In an embodiment, the subset of frames is chosen at random. Furthermore, if the photographer was holding the digital camera only periodically during the video, the disclosed techniques may be applied to only those corresponding frames.

Although this disclosure has described techniques for using ECG biometrics to prove authorship of digital photographs, other biometric techniques may be used instead of or in addition to ECG biometrics. For example, a fingerprint scanner within the digital camera may be used to capture biometric data corresponding to the photographer's fingerprint and embed the biometric fingerprint data into the raw image file. As another example, an iris or retinal scanner within the digital camera may be used to capture biometric data corresponding to the photographer's iris and/or retina and embed the biometric iris/retinal data into the raw image file.

Figure 10:
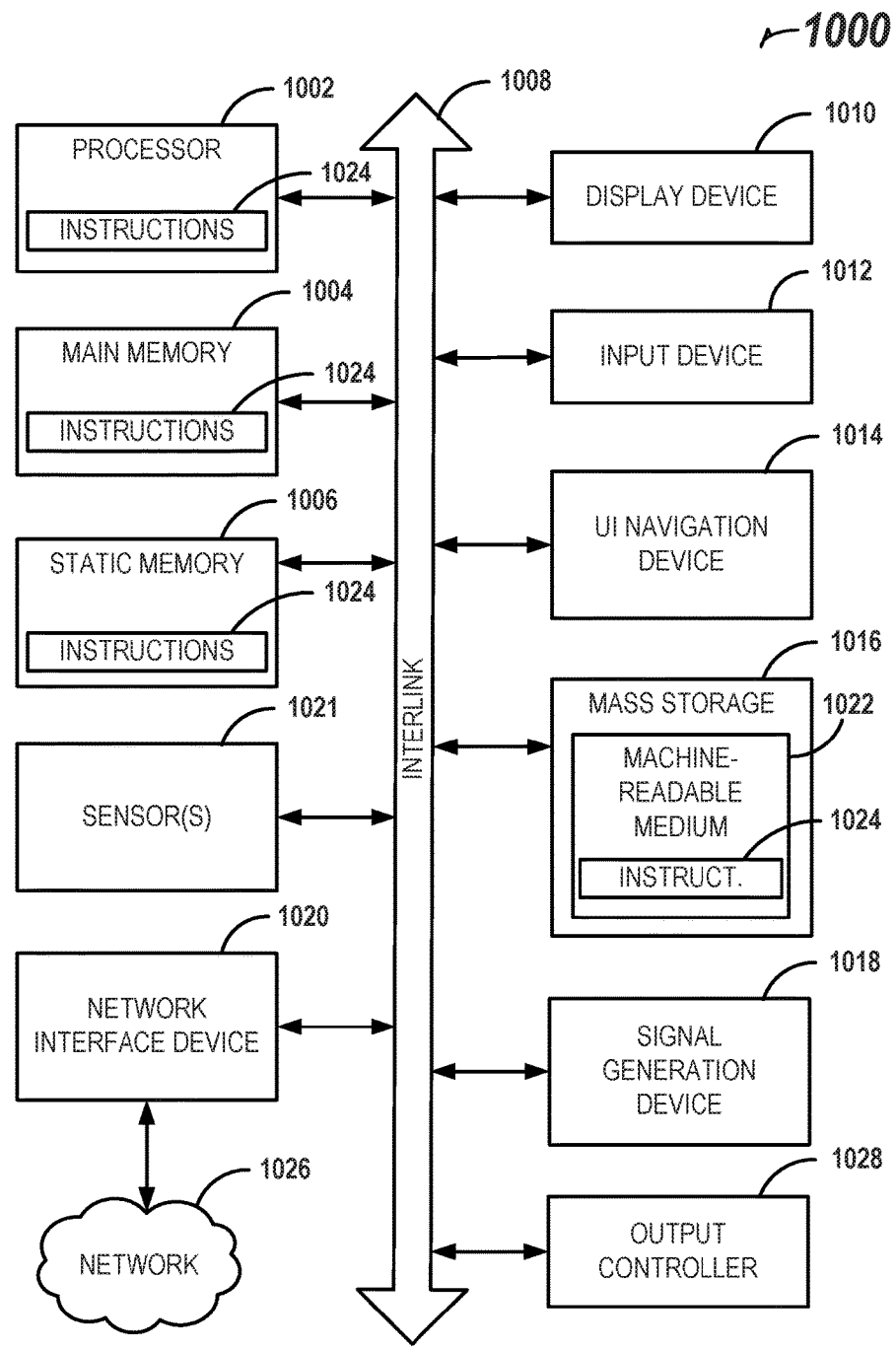
FIG. 10 is a block diagram illustrating an example of a machine, upon which any one or more example embodiments may be implemented.

FIG. 10 is a block diagram illustrating an example of a machine 1000, upon which any one or more example embodiments may be implemented. In alternative embodiments, the machine 1000 may operate as a standalone device or may be connected (e.g., networked) to other machines. In a networked deployment, the machine 1000 may operate in the capacity of a server machine, a client machine, or both in a client-server network environment. In an example, the machine 1000 may act as a peer machine in a peer-to-peer (P2P) (or other distributed) network environment. The machine 1000 may implement or include any portion of the systems, devices, or methods illustrated in FIGS. 1-9, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., USB, parallel, or other wired or wireless (e.g., infrared (IR), near field communication (NFC), etc.) connection to communicate or control one or more peripheral devices (e.g., a printer, card reader, etc.)

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

Although the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the machine 1000, and includes digital or analog communications signals or other intangible medium to facilitate communication of such software.

Additional Notes & Example Embodiments

Example 1 is a device for proving authorship of a digital photograph using electrocardiogram (ECG) biometrics, the device comprising: an ECG sensor electrically coupled to a plurality of ECG electrodes located on an exterior portion of a digital camera, the plurality of ECG electrodes to detect voltages from each of a left hand and a right hand of a human while the human is holding the digital camera with both hands, the ECG sensor to produce an ECG signal corresponding to the human and corresponding to the detected voltages; a secure memory including a stenographic key and a cryptographic key, each key unique to the device; a stenographic engine to use the stenographic key to embed the produced ECG signal into a raw image file generated by the digital camera to produce a watermarked image; and a cryptographic engine to use the cryptographic key to encrypt the watermarked image to produce an encrypted image.

In Example 2, the subject matter of Example 1 optionally includes wherein the stenographic key and the cryptographic key are each encrypted; wherein only the stenographic engine is able to decrypt the encrypted stenographic key; and wherein only the cryptographic engine is able to decrypt the encrypted cryptographic key.

In Example 3, the subject matter of any one or more of Examples 1-2 optionally include wherein the cryptographic engine is to delete the watermarked image after the cryptographic engine has produced the encrypted image.

In Example 4, the subject matter of any one or more of Examples 1-3 optionally include wherein the device is a hardware dongle.

In Example 5, the subject matter of any one or more of Examples 1-4 optionally include wherein the device is the digital camera.

In Example 6, the subject matter of any one or more of Examples 1-5 optionally include wherein the device is a removable cartridge that is accepted into a peripheral slot of the digital camera.

In Example 7, the subject matter of any one or more of Examples 1-6 optionally include wherein the cryptographic engine is to use the Advanced Encryption Standard (AES) encryption algorithm; and wherein the cryptographic key is at least 128 bits long.

In Example 8, the subject matter of any one or more of Examples 1-7 optionally include a network interface device to transmit the encrypted image and the raw image file to an external device.

In Example 9, the subject matter of any one or more of Examples 1-8 optionally include wherein to prove authorship of a digital photograph using ECG biometrics includes: to receive, from at least one of a network interface device and a data storage device, the encrypted image corresponding to the digital photograph whose authorship is to be proved; the cryptographic engine, upon receipt of the encrypted image whose authorship is to be proved, to use the cryptographic key to decrypt the encrypted image to produce the watermarked image and provide the watermarked image to the stenographic engine; the stenographic engine, upon receipt of the watermarked image from the cryptographic engine, to use the stenographic key to extract from the watermarked image the raw image file and the ECG signal corresponding to a photographer who authored the digital photograph; and the device to transmit the raw image file and the ECG signal to an external computer that is to execute software to: compare the raw image file to the digital photograph whose authorship is to be proved; compare the ECG signal to a second ECG signal measured from a disputed author; and determine whether the digital photograph and the raw image file are statistically similar and whether the ECG signal and the second ECG signal are statistically similar.

Example 10 is a device for proving authorship of a digital photograph using electrocardiogram (ECG) biometrics, the device comprising: an interface device to receive an encrypted image corresponding to the digital photograph whose authorship is to be proved; a secure memory including a stenographic key and a cryptographic key, each key unique to the device; a cryptographic engine to use the cryptographic key to decrypt the encrypted image, the decryption to produce a watermarked image; and a stenographic engine to use the stenographic key to extract from the watermarked image an ECG signal and a raw image file, the extracted ECG signal corresponding to a photographer who authored the digital photograph; wherein the ECG signal and the raw image file are to be transmitted, via the interface device, to an external computer that is to execute software to: compare the raw image file to the digital photograph whose authorship is to be proved; and compare the ECG signal to a second ECG signal measured from a disputed author; and determine whether the digital photograph and the raw image file are statistically similar and whether the ECG signal and the second ECG signal are statistically similar.

In Example 11, the subject matter of Example 10 optionally includes wherein the stenographic key and the cryptographic key are each encrypted; wherein only the stenographic engine is able to decrypt the encrypted stenographic key; and wherein only the cryptographic engine is able to decrypt the encrypted cryptographic key.

In Example 12, the subject matter of any one or more of Examples 10-11 optionally include wherein the stenographic engine is to delete the watermarked image after the stenographic engine has extracted the ECG signal and the raw image file.

In Example 13, the subject matter of any one or more of Examples 10-12 optionally include wherein the device is a hardware dongle.

In Example 14, the subject matter of any one or more of Examples 10-13 optionally include wherein the device is a digital camera.

In Example 15, the subject matter of any one or more of Examples 10-14 optionally include wherein the device is a removable cartridge that is accepted into a peripheral slot of a digital camera.

In Example 16, the subject matter of any one or more of Examples 10-15 optionally include wherein the cryptographic engine is to use the Advanced Encryption Standard (AES) encryption algorithm; and wherein the cryptographic key is at least 128 bits long.

Example 17 is a method of proving authorship of a digital photograph using electrocardiogram (ECG) biometrics, the method comprising: detecting, using a plurality of ECG electrodes located on an exterior portion of a digital camera, voltages from each of a left hand and a right hand of a human while the human is holding the digital camera with both hands; producing, using an ECG sensor electrically coupled to the plurality of ECG electrodes, an ECG signal corresponding to the human and corresponding to the detected voltages; embedding, using a stenographic engine and a stenographic key, the produced ECG signal into a raw image file generated by the digital camera to produce a watermarked image; encrypting, using a cryptographic engine and a cryptographic key, the watermarked image to produce an encrypted image.

In Example 18, the subject matter of Example 17 optionally includes wherein the stenographic key and the cryptographic key are each encrypted; wherein only the stenographic engine is able to decrypt the encrypted stenographic key; and wherein only the cryptographic engine is able to decrypt the encrypted cryptographic key.

In Example 19, the subject matter of any one or more of Examples 17-18 optionally include deleting the watermarked image after the cryptographic engine has produced the encrypted image.

In Example 20, the subject matter of any one or more of Examples 17-19 optionally include wherein the method is performed by a hardware dongle.

In Example 21, the subject matter of any one or more of Examples 17-20 optionally include wherein the method is performed by the digital camera.

In Example 22, the subject matter of any one or more of Examples 17-21 optionally include wherein the method is performed by a removable cartridge that is accepted into a peripheral slot of the digital camera.

In Example 23, the subject matter of any one or more of Examples 17-22 optionally include wherein the cryptographic engine uses the Advanced Encryption Standard (AES) encryption algorithm; and wherein the cryptographic key is at least 128 bits long.

In Example 24, the subject matter of any one or more of Examples 17-23 optionally include transmitting the encrypted image and the raw image file to an external device.

In Example 25, the subject matter of any one or more of Examples 17-24 optionally include wherein to prove authorship of a digital photograph using ECG biometrics includes: receiving, from at least one of a network interface device and a data storage device, the encrypted image corresponding to the digital photograph whose authorship is to be proved; decrypting, using the cryptographic engine and the cryptographic key, the encrypted image to produce the watermarked image and provide the watermarked image to the stenographic engine; extracting, using the stenographic engine and the stenographic key, from the watermarked image the raw image file and the ECG signal; and transmitting the raw image file and the ECG signal to an external computer that is to execute software that is to: compare the raw image file to the digital photograph whose authorship is to be proved; compare the ECG signal to a second ECG signal measured from a disputed author; and determine whether the digital photograph and the raw image file are statistically similar and whether the ECG signal and the second ECG signal are statistically similar.

Example 26 is a method of using a device to prove authorship of a digital photograph using electrocardiogram (ECG) biometrics, the method comprising: receiving, from at least one of a network interface device and a data storage device, an encrypted image corresponding to a digital photograph whose authorship is to be proved; decrypting, using a cryptographic engine and a cryptographic key, the encrypted image to produce a watermarked image; providing the watermarked image to a stenographic engine; extracting, using the stenographic engine and a stenographic key, from the watermarked image a raw image file and an ECG signal corresponding to a photographer who authored the digital photograph; and transmitting the raw image file and the ECG signal to an external computer that is to execute software to: compare the raw image file to the digital photograph whose authorship is to be proved; compare the ECG signal to a second ECG signal measured from a disputed author; and determine whether the digital photograph and the raw image file are statistically similar and whether the ECG signal and the second ECG signal are statistically similar.

In Example 27, the subject matter of Example 26 optionally includes wherein each of the stenographic key and the cryptographic key are: encrypted, unique to the device, and stored in a secure memory of the device; wherein only the stenographic engine is able to decrypt the encrypted stenographic key; and wherein only the cryptographic engine is able to decrypt the encrypted cryptographic key.

In Example 28, the subject matter of any one or more of Examples 26-27 optionally include deleting the watermarked image after the cryptographic engine has produced the encrypted image.

In Example 29, the subject matter of any one or more of Examples 26-28 optionally include wherein the method is performed by a hardware dongle.

In Example 30, the subject matter of any one or more of Examples 26-29 optionally include wherein the method is performed by the digital camera.

In Example 31, the subject matter of any one or more of Examples 26-30 optionally include wherein the method is performed by a removable cartridge that is accepted into a peripheral slot of the digital camera.

In Example 32, the subject matter of any one or more of Examples 26-31 optionally include wherein the cryptographic engine uses the Advanced Encryption Standard (AES) encryption algorithm; and wherein the cryptographic key is at least 128 bits long.

Example 33 is at least one machine-readable medium including instructions, which when executed by a machine, cause the machine to perform operations of any of the methods of Examples 17-32.

Example 34 is an apparatus comprising means for performing any of the methods of Examples 17-32.

Example 35 is an apparatus for proving authorship of a digital photograph using electrocardiogram (ECG) biometrics, the apparatus comprising: means for detecting voltages from each of a left hand and a right hand of a human while the human is holding the digital camera with both hands; means for producing an ECG signal corresponding to the human and corresponding to the detected voltages; means for embedding the produced ECG signal into a raw image file generated by the digital camera to produce a watermarked image; means for encrypting the watermarked image to produce an encrypted image.

In Example 36, the subject matter of Example 35 optionally includes means for deleting the watermarked image after the encrypted image has been produced.

In Example 37, the subject matter of any one or more of Examples 35-36 optionally include wherein the method is performed by a hardware dongle.

In Example 38, the subject matter of any one or more of Examples 35-37 optionally include wherein the method is performed by the digital camera.

In Example 39, the subject matter of any one or more of Examples 35-38 optionally include wherein the method is performed by a removable cartridge that is accepted into a peripheral slot of the digital camera.

In Example 40, the subject matter of any one or more of Examples 35-39 optionally include means for transmitting the encrypted image and the raw image file to an external device.

In Example 41, the subject matter of any one or more of Examples 35-40 optionally include wherein to prove authorship of a digital photograph using ECG biometrics includes: means for receiving the encrypted image corresponding to the digital photograph whose authorship is to be proved; means for decrypting the encrypted image to produce the watermarked image and provide the watermarked image to the stenographic engine; means for extracting from the watermarked image the raw image file and the ECG signal; and means for transmitting the raw image file and the ECG signal to an external computer that is to execute software to: compare the raw image file to the digital photograph whose authorship is to be proved; compare the ECG signal to a second ECG signal measured from a disputed author; and determine whether the digital photograph and the raw image file are statistically similar and whether the ECG signal and the second ECG signal are statistically similar.

Example 42 is an apparatus for proving authorship of a digital photograph using electrocardiogram (ECG) biometrics, the apparatus comprising: means for receiving an encrypted image corresponding to a digital photograph whose authorship is to be proved; means for decrypting the encrypted image to produce a watermarked image; means for providing the watermarked image to a stenographic engine; means for extracting from the watermarked image a raw image file and an ECG signal corresponding to a photographer who authored the digital photograph; and means for transmitting the raw image file and the ECG signal to an external computer that is to execute software to: compare the raw image file to the digital photograph whose authorship is to be proved; compare the ECG signal to a second ECG signal measured from a disputed author; and determine whether the digital photograph and the raw image file are statistically similar and whether the ECG signal and the second ECG signal are statistically similar.

In Example 43, the subject matter of Example 42 optionally includes means for deleting the watermarked image after the encrypted image has been produced.

In Example 44, the subject matter of any one or more of Examples 42-43 optionally include wherein the method is performed by a hardware dongle.

In Example 45, the subject matter of any one or more of Examples 42-44 optionally include wherein the method is performed by the digital camera.

In Example 46, the subject matter of any one or more of Examples 42-45 optionally include wherein the method is performed by a removable cartridge that is accepted into a peripheral slot of the digital camera.

Each of these non-limiting examples can stand on its own, or can be combined in various permutations or combinations with one or more of the other examples.

Conventional terms in the fields of computer systems and digital photography have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

The above description is intended to be illustrative, and not restrictive. For example, the above-described examples (or one or more aspects thereof) may be used in combination with each other. Other embodiments may be used, such as by one of ordinary skill in the art upon reviewing the above description.

What is claimed is:

1. A device for proving authorship of a digital photograph using electrocardiogram (ECG) biometrics, the device comprising:
    an ECG sensor electrically coupled to a plurality of ECG electrodes located on an exterior portion of a digital camera, the plurality of ECG electrodes to detect voltages from each of a left hand and a right hand of a human while the human is holding the digital camera with both hands, the ECG sensor to produce an ECG signal corresponding to the human and corresponding to the detected voltages;
    a secure memory including a stenographic key and a cryptographic key, each key unique to the device;
    a stenographic engine to use the stenographic key to embed the produced ECG signal into a raw image file generated by the digital camera to produce a watermarked image; and
    a cryptographic engine to use the cryptographic key to encrypt the watermarked image to produce an encrypted image.

2. The device of claim 1, wherein the cryptographic engine is to delete the watermarked image after the cryptographic engine has produced the encrypted image.

3. The device of claim 1, wherein the device is a hardware dongle.

4. The device of claim 1, wherein the device is the digital camera.

5. The device of claim 1, wherein the device is a removable cartridge that is accepted into a peripheral slot of the digital camera.

6. The device of claim 1, wherein to prove authorship of a digital photograph using ECG biometrics includes:

to receive, from at least one of a network interface device and a data storage device, the encrypted image corresponding to the digital photograph whose authorship is to be proved;

the cryptographic engine, upon receipt of the encrypted image whose authorship is to be proved, to use the cryptographic key to decrypt the encrypted image to produce the watermarked image and provide the watermarked image to the stenographic engine;

the stenographic engine, upon receipt of the watermarked image from the cryptographic engine, to use the stenographic key to extract from the watermarked image the raw image file and the ECG signal corresponding to a photographer who authored the digital photograph; and the device to transmit the raw image file and the ECG signal to an external computer that is to execute software to:

compare the raw image file to the digital photograph whose authorship is to be proved;

compare the ECG signal to a second ECG signal measured from a disputed author; and determine whether the digital photograph and the raw image file are statistically similar and whether the ECG signal and the second ECG signal are statistically similar.

7. A device for proving authorship of a digital photograph using electrocardiogram (ECG) biometrics, the device comprising:

an interface device to receive an encrypted image corresponding to the digital photograph whose authorship is to be proved;

a secure memory including a stenographic key and a cryptographic key, each key unique to the device;

a cryptographic engine to use the cryptographic key to decrypt the encrypted image, the decryption to produce a watermarked image; and a stenographic engine to use the stenographic key to extract from the watermarked image an ECG signal and a raw image file, the extracted ECG signal corresponding to a photographer who authored the digital photograph; wherein the ECG signal and the raw image file are to be transmitted, via the interface device, to an external computer that is to execute software to:

compare the raw image file to the digital photograph whose authorship is to be proved; and compare the ECG signal to a second ECG signal measured from a disputed author; and determine whether the digital photograph and the raw image file are statistically similar and whether the ECG signal and the second ECG signal are statistically similar.

8. The device of claim 7, wherein the stenographic engine is to delete the watermarked image after the stenographic engine has extracted the ECG signal and the raw image file.

9. The device of claim 7, wherein the device is a hardware dongle.

10. The device of claim 7, wherein the device is a digital camera.

11. The device of claim 7, wherein the device is a removable cartridge that is accepted into a peripheral slot of a digital camera.

12. A method of proving authorship of a digital photograph using electrocardiogram (ECG) biometrics, the method comprising:

detecting, using a plurality of ECG electrodes located on an exterior portion of a digital camera, voltages from each of a left hand and a right hand of a human while the human is holding the digital camera with both hands;

producing, using an ECG sensor electrically coupled to the plurality of ECG electrodes, an ECG signal corresponding to the human and corresponding to the detected voltages;

embedding, using a stenographic engine and a stenographic key, the produced ECG signal into a raw image file generated by the digital camera to produce a watermarked image;

encrypting, using a cryptographic engine and a cryptographic key, the watermarked image to produce an encrypted image.

13. The method of claim 12, further comprising:

deleting the watermarked image after the cryptographic engine has produced the encrypted image.

14. The method of claim 12, wherein the method is performed by a hardware dongle.

15. The method of claim 12, wherein the method is performed by the digital camera.

16. The method of claim 12, wherein the method is performed by a removable cartridge that is accepted into a peripheral slot of the digital camera.

17. The method of claim 12, wherein to prove authorship of a digital photograph using ECG biometrics includes:

receiving, from at least one of a network interface device and a data storage device, the encrypted image corresponding to the digital photograph whose authorship is to be proved;

decrypting, using the cryptographic engine and the cryptographic key, the encrypted image to produce the watermarked image and provide the watermarked image to the stenographic engine;

extracting, using the stenographic engine and the stenographic key, from the watermarked image the raw image file and the ECG signal; and transmitting the raw image file and the ECG signal to an external computer that is to execute software that is to:

compare the raw image file to the digital photograph whose authorship is to be proved;

compare the ECG signal to a second ECG signal measured from a disputed author; and determine whether the digital photograph and the raw image file are statistically similar and whether the ECG signal and the second ECG signal are statistically similar.

18. At least one machine-readable medium including instructions, which when executed by a machine, cause the machine to:

detect, using a plurality of ECG electrodes located on an exterior portion of a digital camera, voltages from each of a left hand and a right hand of a human while the human is holding the digital camera with both hands;

produce, using an ECG sensor electrically coupled to the plurality of ECG electrodes, an ECG signal corresponding to the human and corresponding to the detected voltages;

embed, using a stenographic engine and a stenographic key, the produced ECG signal into a raw image file generated by the digital camera to produce a watermarked image;

encrypt, using a cryptographic engine and a cryptographic key, the watermarked image to produce an encrypted image.

19. The at least one machine-readable medium of claim 18, wherein the instructions further cause the machine to:

delete the watermarked image after the cryptographic engine has produced the encrypted image.

20. The at least one machine-readable medium of claim 18, wherein the machine is a hardware dongle.

21. The at least one machine-readable medium of claim 18, wherein the machine is the digital camera.

22. The at least one machine-readable medium of claim 18, wherein the machine is a removable cartridge that is accepted into a peripheral slot of the digital camera.

23. The at least one machine-readable medium of claim 18, wherein the instructions further cause the machine to use ECG biometrics to prove authorship of a digital photograph, the instructions including to cause the machine to:

receive, from at least one of a network interface device and a data storage device, the encrypted image corresponding to the digital photograph whose authorship is to be proved;

decrypt, using the cryptographic engine and the cryptographic key, the encrypted image to produce the watermarked image and provide the watermarked image to the stenographic engine;

extract, using the stenographic engine and the stenographic key, from the watermarked image the raw image file and the ECG signal; and transmit the raw image file and the ECG signal to an external computer that is to execute software that is to:
    compare the raw image file to the digital photograph whose authorship is to be proved;
    compare the ECG signal to a second ECG signal measured from a disputed author; and
    determine whether the digital photograph and the raw image file are statistically similar and whether the ECG signal and the second ECG signal are statistically similar.

* * * * *